United States Patent
Vo et al.

(10) Patent No.: US 12,393,536 B2
(45) Date of Patent: Aug. 19, 2025

(54) DETECTION OF THIRD-PARTY DEVICES ON A VEHICLE BUS

(71) Applicant: Positioning Universal Inc., San Diego, CA (US)

(72) Inventors: Vinh Vo, San Diego, CA (US); Cindy Liao, San Diego, CA (US)

(73) Assignee: POSITIONING UNIVERSAL INC., San Diego, CA (US)

( * ) Notice: Subject to any disclaimer, the term of this patent is extended or adjusted under 35 U.S.C. 154(b) by 1 day.

(21) Appl. No.: 18/331,526

(22) Filed: Jun. 8, 2023

(65) Prior Publication Data

US 2023/0401166 A1    Dec. 14, 2023

Related U.S. Application Data

(60) Provisional application No. 63/350,117, filed on Jun. 8, 2022.

(51) Int. Cl.
*G06F 13/36* (2006.01)
*G06F 13/42* (2006.01)

(52) U.S. Cl.
CPC .......... *G06F 13/36* (2013.01); *G06F 13/4282* (2013.01); *G06F 2213/40* (2013.01)

(58) Field of Classification Search
CPC .................................................... G06N 20/00
See application file for complete search history.

(56) References Cited

U.S. PATENT DOCUMENTS

| | | | |
|---|---|---|---|
| 2016/0294746 A1* | 10/2016 | Boothroyd | H04L 51/063 |
| 2017/0168888 A1* | 6/2017 | Prasad | G06F 11/0721 |
| 2019/0104001 A1* | 4/2019 | Juliato | H04L 25/4917 |

* cited by examiner

*Primary Examiner* — Henry Tsai
*Assistant Examiner* — Juanito C Borromeo
(74) *Attorney, Agent, or Firm* — Sheridan Ross P.C.

(57) ABSTRACT

Embodiments of the disclosure provide for detecting and avoiding conflicts with a device on a communications bus. According to one embodiment, avoiding redundant or conflicting communications can comprise listening to electronic messages exchanged on the communications bus and detecting a second device a second device communicating on the communications bus based on the electronic messages exchanged on the communication bus. The electronic messages can comprise requests for data and responses to the requests for data. For example, the communications bus can comprise a Controller Area Network (CAN) bus within a vehicle and the first device and the second device can comprise On-Board Diagnostic (OBD) II devices. Detecting the second device communicating on the communications bus can comprise detecting an address used by the second device.

20 Claims, 5 Drawing Sheets

DETECTION OF THIRD-PARTY DEVICES ON A VEHICLE BUS

CROSS REFERENCE TO RELATED APPLICATIONS

The present application claims the benefits of and priority, under 35 U.S.C. § 119(e), to U.S. Provisional Application No. 63/350,117, filed Jun. 8, 2022, entitled "DETECTION OF THIRD-PARTY DEVICES ON A VEHICLE BUS" of which the entire disclosure of which is incorporated by reference for all purposes.

FIELD OF THE DISCLOSURE

Embodiments of the present disclosure relate generally to methods and systems for detecting devices on a communications network and more particularly to detecting and avoiding conflicts with a third-party device on a Controller Area Network (CAN) bus of a vehicle.

BACKGROUND

A number of different On-Board Diagnostic (OBD) II compliant devices such as diagnostic readers, fuel data recorders, fleet management recorders, etc. which utilize OBD II data are commonly available and frequently used with vehicles manufactured after 1996. Such aftermarket devices could interference with the diagnostic process when a service tool is used to diagnose vehicle problems. This typically requires that the aftermarket device be uninstalled, and the service scan tool attached to the OBD II port of the vehicle. Additionally, two or more of these devices could be connect with the Controller Area Network (CAN) bus of the vehicle communicate on the CAN bus at the same time. If these devices are not coordinating the communication, they could request data back-to-back without giving the vehicle enough time to respond to each request. As an example, one device might send a request for engine Revolutions Per Minute (RPM) data and then the other device sends a request for speed before the ECU responds with the RPM reading. This kind of communication conflict or overlap could violate the defined usage of the OBD II protocol and cause one or both request messages to be ignored. Moreover, it could cause the ECU to behave abnormally. Hence, there is a need for improved methods and systems for detecting and avoiding conflicts with third-party devices on a vehicle bus.

BRIEF SUMMARY

Embodiments of the disclosure provide systems and methods for detecting and avoiding conflicts with a device on a communications bus. According to one embodiment, a method for avoiding redundant or conflicting communications on a communications bus can comprise listening, by a processor of a first device, to electronic messages exchanged on the communications bus and detecting a second device a second device communicating on the communications bus based on the electronic messages exchanged on the communication bus. The electronic messages can comprise requests for data and responses to the requests for data. For example, the communications bus can comprise a Controller Area Network (CAN) bus within a vehicle and the first device and the second device can comprise On-Board Diagnostic (OBD) II devices. Detecting the second device communicating on the communications bus can comprise detecting an address used by the second device.

The processor of the first device can then monitor the requests for data sent from the second device on the communications bus and the responses to the requests sent to the second device on the communications bus, i.e., based on the detected address of the second device, and modify electronic messages sent by the first device on the communications bus based on the monitoring of the requests for data sent from the second device on the communications bus and the responses to the requests sent to the second device on the communications bus. Monitoring the requests for data sent from the second device on the communications bus can comprise identifying data requested by the second device in the requests for data sent from the second device and a timing of the requests for data sent from the second device on the communications bus. Modifying electronic messages sent by the first device on the communications bus based on the monitoring of the requests for data sent from the second device on the communications bus and the responses to the requests sent to the second device on the communications bus can comprise using data from the responses to the requests sent to the second device on the communications bus instead of sending a request for the data from the first device. For example, the data can be identified in a predefined list of data collected by the first device. Additionally, or alternatively, modifying electronic messages sent by the first device on the communications bus based on the monitoring of the requests for data sent from the second device on the communications bus and the responses to the requests sent to the second device on the communications bus can be based on a learned model of electronic messages on the communications bus. In such cases, the learned model can be trained based on the listening to the electronic messages exchanged on the communications bus.

According to another embodiment, a monitoring device can comprise a processor and a memory coupled with and readable by the processor. The memory can store therein a set of instructions which, when executed by the processor, causes the processor to listen to electronic messages exchanged on the communications bus and detect a third-party device communicating on the communications based on the electronic messages exchanged on the communication bus. The electronic messages can comprise requests for data and responses to the requests for data. For example, the communications bus can comprise a Controller Area Network (CAN) bus within a vehicle and the monitoring device and the third-party device can comprise On-Board Diagnostic (OBD) II devices. Detecting the third-party device communicating on the communications bus can comprise detecting an address used by the third-party device.

The instructions can further cause the processor to monitor the requests for data sent from the third-party device on the communications bus and the responses to the requests sent to the third-party device on the communications bus, i.e., based on the detected address of the third-party device, and modify electronic messages sent by the monitoring device on the communications bus based on the monitoring of the requests for data sent from the third-party device on the communications bus and the responses to the requests sent to the third-party device on the communications bus. For example, monitoring the requests for data sent from the third-party device on the communications bus can comprise identifying data requested by the third-party device in the requests for data sent from the third-party device and a timing of the requests for data sent from the third-party device on the communications bus. In such cases, modifying electronic messages sent by the monitoring device on the communications bus based on the monitoring of the requests for data sent from the third-party device on the communications bus and the responses to the requests sent to the third-party device on the communications bus can comprise using data from the responses to the requests sent to the third-party device on the communications bus instead of sending a request for the data from the monitoring device.

In some cases, the data can be identified in a predefined list of data collected by the monitoring device. Additionally, or alternatively, modifying electronic messages sent by the monitoring device on the communications bus based on the monitoring of the requests for data sent from the third-party device on the communications bus and the responses to the requests sent to the third-party device on the communications bus can be based on a learned model of electronic messages on the communications bus. In such cases, the learned model can be trained based on the listening to the electronic messages exchanged on the communications bus.

According to another embodiment, a non-transitory, computer-readable medium can comprise a set of instructions stored therein which, when executed by a processor, causes the processor to listen to electronic messages exchanged on the communications bus and detect a third-party device communicating on the communications based on the electronic messages exchanged on the communication bus. wherein the electronic messages comprise requests for data and responses to the requests for data. For example, the communications bus can comprise a Controller Area Network (CAN) bus within a vehicle and the monitoring device and the third-party device can comprise On-Board Diagnostic (OBD) II devices. Detecting the third-party device communicating on the communications bus can comprise detecting an address used by the second device.

The instructions can further cause the processor to monitor the requests for data sent from the third-party device on the communications bus and the responses to the requests sent to the third-party device on the communications bus, i.e., based on the detected address of the third-party device, and modify electronic messages sent by the monitoring device on the communications bus based on the monitoring of the requests for data sent from the third-party device on the communications bus and the responses to the requests sent to the third-party device on the communications bus. For example, monitoring the requests for data sent from the third-party device on the communications bus can comprise identifying data requested by the third-party device in the requests for data sent from the third-party device and a timing of the requests for data sent from the third-party device on the communications bus. In such cases, modifying electronic messages sent by the monitoring device on the communications bus based on the monitoring of the requests for data sent from the third-party device on the communications bus and the responses to the requests sent to the third-party device on the communications bus can comprise using data from the responses to the requests sent to the third-party device on the communications bus instead of sending a request for the data from the monitoring device.

In some cases, the data can be identified in a predefined list of data collected by the monitoring device. Additionally, or alternatively, modifying electronic messages sent by the monitoring device on the communications bus based on the monitoring of the requests for data sent from the third-party device on the communications bus and the responses to the requests sent to the third-party device on the communications bus can be based on a learned model of electronic messages on the communications bus. In such cases, the learned model can be trained based on the listening to the electronic messages exchanged on the communications bus.

Figure 1:
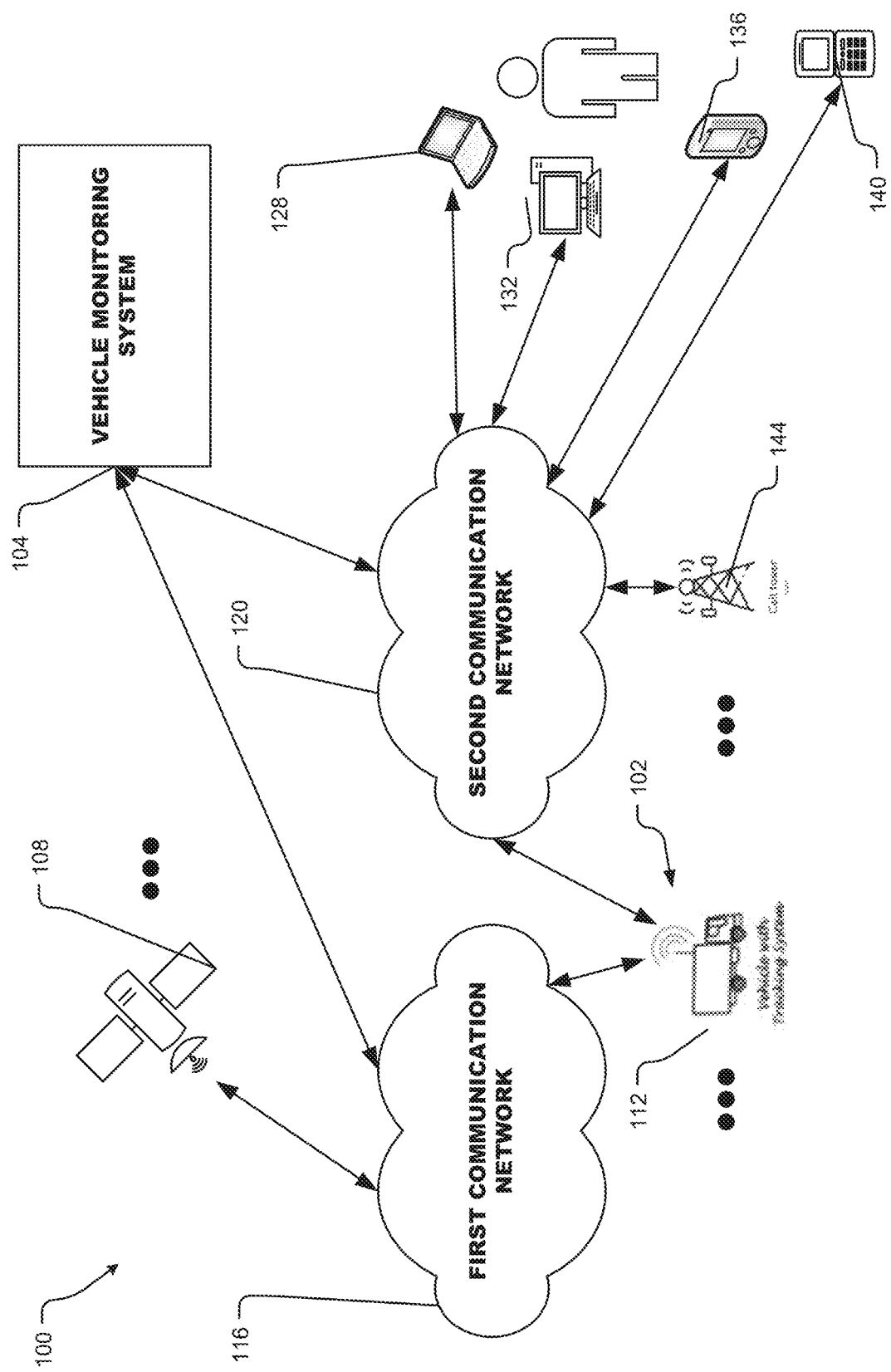
FIG. 1 is a block diagram illustrating elements of an exemplary environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programmable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary environment in which embodiments of the present disclosure may be implemented. More specifically, this example illustrates a vehicle monitoring architecture 100, comprising a monitoring device 102 on a monitored vehicle 112 (shown as a truck), in communication with a satellite navigation system 108 via a first communication network 116 and with a vehicle monitoring system 104 via a second communication network 120, is shown in accordance with embodiments of the present disclosure. The monitored vehicle 112 can be any vehicle, aircraft, ship, trailer, storage container or other cargo, shipment, electronic device such as a smart phone, or other asset. As shown, multiple monitored vehicles 112 can be monitored simultaneously. The vehicle monitoring system 104, in turn, is in communication with the satellite navigation system 108, via the first communication network 116, and one or more computational devices, such as a laptop 128, personal computer 132, personal digital assistant 136 (e.g., a tablet computer), and/or a smart phone 140, of a user 124 via the second communication network 120. The satellite navigation system 108 can be any global or regional satnav system and typically includes not only satellites but also ground stations to monitor and control satellites and receivers to listen for signals from the satellites. The first communication network 116 can be a radio network configured to operate with the satellite navigation system 108 to provide radionavigation-satellite service.

The second communication network 120 may comprise any type of known communication medium or collection of communication media and may use any type of protocols to transport messages between endpoints. The second communication network 120 may include wired and/or wireless communication technologies (as shown by plural base stations 144). The Internet is an example of the second communication network 120 that constitutes an Internet Protocol ("IP") network comprising computers, computing networks, and other communication devices located all over the world, which are connected through many telephone systems and other means. Other examples of the second communication network 120 include, without limitation, a standard Plain Old Telephone System ("POTS"), an Integrated Services Digital Network ("ISDN"), the Public Switched Telephone Network ("PSTN"), a Local Area Network ("LAN"), a Wide Area Network ("WAN"), a VoIP network, a Session Initiation Protocol ("SIP") network, a cellular network, and any other type of packet-switched or circuit-switched network known in the art. In addition, it can be appreciated that the second communication network 120 need not be limited to any one network type, and instead may be comprised of a number of different networks and/or network types. The second communication network 120 may comprise a number of different communication media such as coaxial cable, copper cable/wire, fiber-optic cable, antennas for transmitting/receiving wireless messages, and combinations thereof.

Generally speaking, the monitoring device 102 can collect information regarding operation and/or location of the monitored vehicle 112. This information can include, but is not limited to location information obtained through the first communication network 116 as well as operating parameters of the vehicle. This collected information can be provided by the monitoring device 102 to the vehicle monitoring system 104 via the second communication network 120. The vehicle monitoring system 104 can in turn make the information available to users of various devices 128, 132, 136, and 140 through the second communication network 120.

Figure 2:
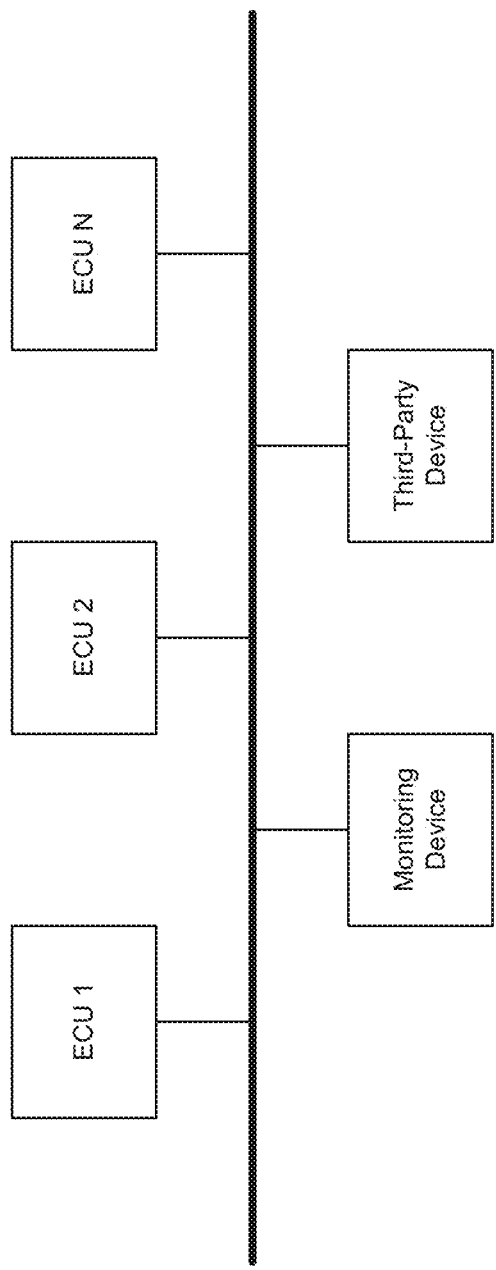
FIG. 2 is a block diagram illustrating elements of a system in which a monitoring device according to embodiments of the present disclosure may be implemented.

FIG. 2 is a block diagram illustrating elements of a system in which a monitoring device according to embodiments of the present disclosure may be implemented. More specifically, this example illustrates components of an electrical system 200 of a monitored vehicle 112. As illustrated herein the electrical system 200 can include, in part, a communications bus 205 such as a Controller Area Network (CAN) bus. A number of different Electronic Control Units (ECUs) 210A-210C, also known as Electronic Control Modules (ECMs), ca be communicatively coupled with the communications bus 205. As known in the art, the ECUs 210A-210C can each control various elements of the vehicle such as the engine, transmission, anti-lock brakes, climate control, and many other systems. The monitoring device 102 as introduced above can also be coupled with the communications bus 205. Through the communications bus 205, the monitoring device can collect a wide range of information from the ECUs 210A-210C using, for example, the On-Board Diagnostics (OBD) II protocol according to a pre-defined list maintained by the monitoring device 102 and identifying what data is to be collected and when, e.g., a time of day, according to a certain time interval, upon the occurrence of a certain event, etc. Another device, such as a third-party device 215 may also be coupled with the communications network 205. As used herein, the term "third-party device" refers to a device manufactured by a party other than the vehicle manufacturer and other than the manufacturer of the monitoring device 102.

Embodiments of the present disclosure are directed to identifying, by the monitoring device 102, the presence of the third-party device 215 on the communications bus 205 and preventing conflicting or problematic communications on the communications bus 205 as may occur by issuing to the ECUs 210A-210C too many requests for the same data, requests for any data to close in time, etc. Generally speaking, the monitoring device 102 can be adapted to detect the other devices on the communications bus 2-5 by checking the functional address transmitting request messages on the communications bus 205. According to one embodiment, the monitoring device 102 can then be adapted to utilize the requested data from a detected third-party device 215, when possible, to avoid requesting the same data repeatedly. The monitoring device can be further adapted to detect the collected data and the corresponding data rate from the third-party device 215 to train a learning model of communications occurring on the communications bus 205. Such a learning model may provide indications of data requests made by other devices on the communications network 205 and the rate and/or timing of those requests. The monitored device 102 can then, using the learning model, modify requests indicated by the pre-defined data list, i.e., use data provided over the communications bus 205 in response to requests from the third-party device 215 instead of issuing a potentially conflicting or redundant request at the same time or within a pre-defined period of time.

Stated another way and as will be described further below, the monitoring device 102 can be adapted to avoid redundant or conflicting communications on the communications bus 205 by listening to electronic messages exchanged on the communications bus 205. Some of these electronic messages can comprise requests for data and responses to the requests for data. The monitoring device 102 can detect a second device, e.g., a third-party device 215 communicating on the communications bus 205 based on the electronic messages exchanged on the communication bus 205. The monitoring device can then monitor the requests for data sent from the detected third-party device 215 and the responses to the requests sent to the third-party device 215 and modify electronic messages sent by the monitored device 102 on the communications bus 205 based on the monitoring of the requests sent from the responses to the requests sent to the third-party device 215.

Figure 3:
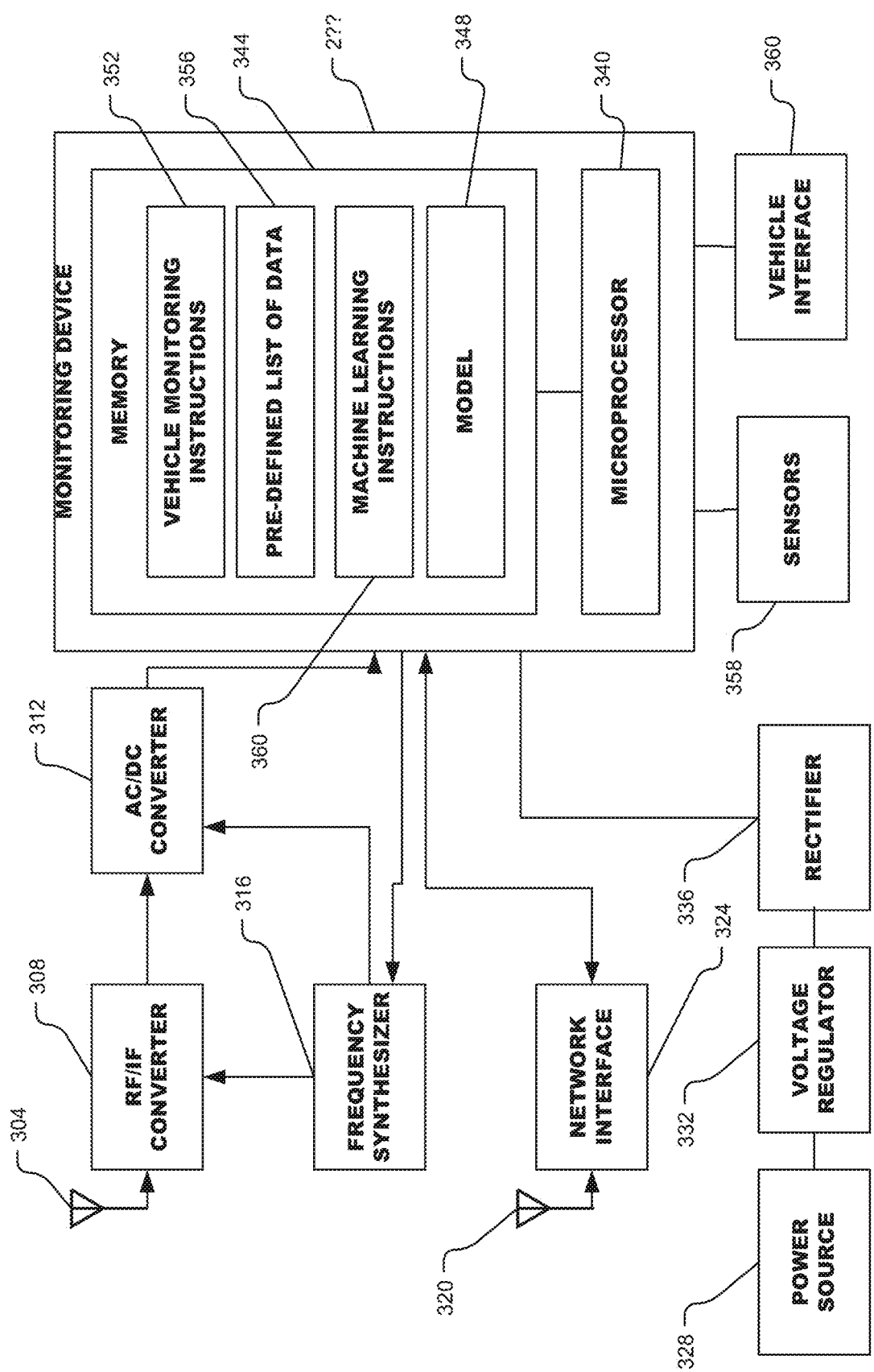
FIG. 3 is a block diagram illustrating elements of a monitoring device in which embodiments of the present disclosure may be implemented.

FIG. 3 is a block diagram illustrating elements of a monitoring device in which embodiments of the present disclosure may be implemented. More specifically, and as illustrated in this example, the monitoring device 102 is shown to include a vehicle monitoring unit 300 engaged with a first antenna 304 (such as an RF antenna) to receive signals from and send signals to the satellite navigation system 108 via the first communication network 116 in communication with an RF/IF converter 308, AC/DC converter 312 and frequency synthesizer 316, a second antenna 320 (such as a WiFi antenna and driver circuit, Bluetooth antenna and driver circuit, or a cellular communication antenna and driver circuit) and network interface 324 to receive signals from and send signals to the vehicle monitoring system 104 via the second communication network 120, and a power source 328, voltage regulator 332, and rectifier 336 to supply electrical energy to the vehicle monitoring unit 300.

The signals transmitted from satellite navigation system 108 are received at the first antenna 304. Through the radio frequency (RF) chain, the input signal is amplified by the RF/IF converter 308 to a selected amplitude, and the frequency is converted by the frequency synthesizer 316 to a desired output frequency. The analogue-to-digital converter (ADC) 312 is used to digitize the amplified and frequency-adjusted input signal.

The configuration of the network interface 324 in signal communication with the second antenna 320 may depend upon the monitoring device 102. Examples of a suitable network interface 324 include, without limitation, an Ethernet port, a USB port, an RS-332 port, an RS-485 port, a NIC, an antenna, a driver circuit, a modulator/demodulator, etc. The network interface 324 may include one or multiple different network interfaces depending upon whether the Monitoring device 102 is connecting to a single (second) communication network 120 or multiple different types of (second) communication networks 120.

The power source 328 may correspond to an internal power supply that provides AC and/or DC power to components of the monitoring device 102. In some embodiments, the power source 328 may correspond to one or multiple batteries or capacitors or other electromagnetic energy storage devices. Alternatively, or additionally, the power source 328 may include a power adapter or wireless charger that converts AC power into DC power for direct application to components of the monitoring device 102, for charging a battery, for charging a capacitor, or a combination thereof.

The vehicle monitoring unit 300, in turn, includes a microprocessor 340 and memory 344. In some embodiments, the microprocessor 340 may correspond to one or many microprocessors, CPUs, microcontrollers, Integrated Circuit (IC) chips, or the like. For instance, the processor 604 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the microprocessor 308 may be provided as a microcontroller, microprocessor, Central Processing Unit (CPU), or plurality of microprocessors that are configured to execute the instructions sets stored in memory 344. The memory 344 may include one or multiple computer memory devices that are volatile or non-volatile. The memory 344 may include volatile and/or non-volatile memory devices. Non-limiting examples of memory 344 include Random Access Memory (RAM), Read Only Memory (ROM), flash memory, Electronically-Erasable Programmable ROM (EE- PROM), Dynamic RAM (DRAM), etc. The memory 344, while illustrated here as a single unit, may in various implementation comprise two or more different types of memory. In some cases, these different types of memory may additionally, or alternatively include a flash memory such as a NAND flash, for example, in which data collected by the monitoring device 102 is stored.

The memory 344 may be configured to store the instruction sets depicted in addition to temporarily storing data for the microprocessor 340 to execute various types of routines or functions. The instruction sets can enable interaction with the IoT vehicle monitoring server 300 and real time tracked object location and state of health monitoring. For example, the memory 344 may store therein a set of vehicle monitoring instructions which, when executed by the microprocessor 340, causes the microprocessor 340 to collect information from the vehicle via one or more sensors 358 installed in or on the vehicle, from the vehicle itself, e.g., though a vehicle interface 360 such as an OBD II or similar interface to the vehicle's CAN bus 205. The data can comprise one or more parameters related to operation and/or location of a vehicle in which the monitoring device 102 is installed. The data to be collected as well as the timing at which it should be collected, e.g., a time of day, an interval, etc., can be indicated in a pre-defined list 356 stored in the memory 344 and used by the vehicle monitoring instructions 352 to initiate requests for this data to ECUs 210A-210C or other components through the vehicle interface 360 and vehicle CAN bus 205.

According to one embodiment, the vehicle monitoring instructions 352 can, when executed by the processor 340, cause the processor 340 to listen, through the vehicle interface 360, to electronic messages exchanged on the communications bus, such as the vehicles CAN bus 205, and detect a third-party device 215 or other device communicating on the communications bus 205 based on the electronic messages exchanged on the communication bus 205. The electronic messages can comprise requests for data and responses to the requests for data. Detecting the third-party device communicating on the communications bus can comprise detecting an address used by the detected device 215.

The vehicle monitoring instructions 352 can further cause the processor 340 to monitor the requests for data sent from the third-party device 215 on the communications bus 205 and the responses to the requests sent to the third-party device 215 on the communications bus 205, i.e., based on the detected address of the third-party device 215, and modify electronic messages sent by the monitoring device 102 on the communications bus 205 based on the monitoring of the requests for data sent from the third-party device 215 on the communications bus 205 and the responses to the requests sent to the third-party device 215 on the communications bus 205. For example, monitoring the requests for data sent from the third-party device 215 on the communications bus 205 can comprise identifying data requested by the third-party device 215 in the requests for data sent from the third-party device 215 and a timing of the requests for data sent from the third-party device 215 on the communications bus 205. In such cases, modifying electronic messages sent by the monitoring device 102 on the communications bus 205 based on the monitoring of the requests for data sent from the third-party device 215 on the communications bus 205 and the responses to the requests sent to the third-party device 215 on the communications bus 205 can comprise using data from the responses to the requests sent to the third-party device 215 on the communications bus instead of sending a request for the data from the monitoring device 102.

In some cases, the data can be identified in a predefined list 356 of data collected by the monitoring device. Additionally, or alternatively, the memory 344 can have stored therein a set of machine learning instructions 360 which, when executed by the processor 340, causes the processor 340 to train a model 348 of communications occurring on the communications bus 205. In such cases, the learned model 348 can be trained based on the listening to the electronic messages exchanged on the communications bus 205. Modifying electronic messages sent by the monitoring device 102 on the communications bus 205 based on the monitoring of the requests for data sent from the third-party device 215 on the communications bus 205 and the responses to the requests sent to the third-party device 215 on the communications bus 205 can additionally, or alternatively, be based on the learned model 348 of electronic messages on the communications bus 205.

Figure 4:
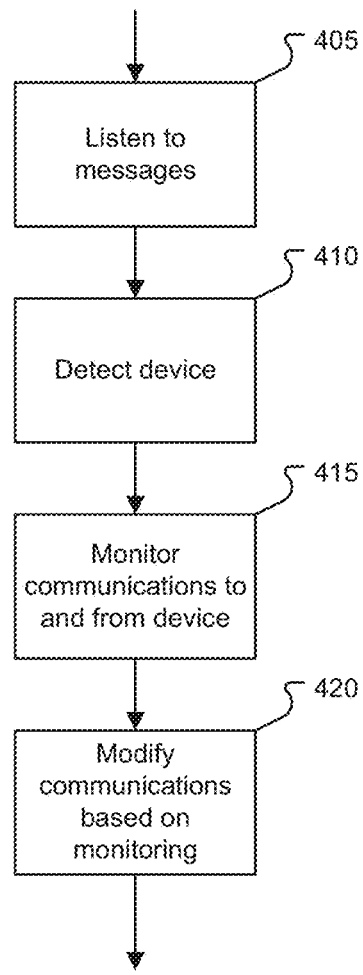
FIG. 4 is a flowchart illustrating an exemplary process for detecting and avoiding conflicts with third-party devices according to one embodiment of the present disclosure.

FIG. 4 is a flowchart illustrating an exemplary process for detecting and avoiding conflicts with third-party devices according to one embodiment of the present disclosure. As illustrated in this example, avoiding redundant or conflicting communications on a communications bus 205 can comprise listening 405, by a first device such as monitoring device 102, to electronic messages exchanged on the communications bus 205 and detecting 410 a second device, such as third-party device 215, communicating on the communications bus 205 based on the electronic messages exchanged on the communication bus 205. The electronic messages can comprise requests for data and responses to the requests for data. Detecting 410 the second device communicating on the communications bus can comprise detecting an address used by the second device.

The first device can then monitor 415 the requests for data sent from the second device on the communications bus 205 and the responses to the requests sent to the second device on the communications bus 205, i.e., based on the detected address of the second device, and modify 420 electronic messages sent by the first device on the communications bus based on the monitoring 415 of the requests for data sent from the second device on the communications bus and the responses to the requests sent to the second device on the communications bus. Monitoring 415 the requests for data sent from the second device on the communications bus can comprise identifying data requested by the second device in the requests for data sent from the second device and a timing of the requests for data sent from the second device on the communications bus. Additional details of an exemplary process for modifying 420 electronic messages sent by the first device on the communications bus based on this monitoring 415 will be described below.

Figure 5:
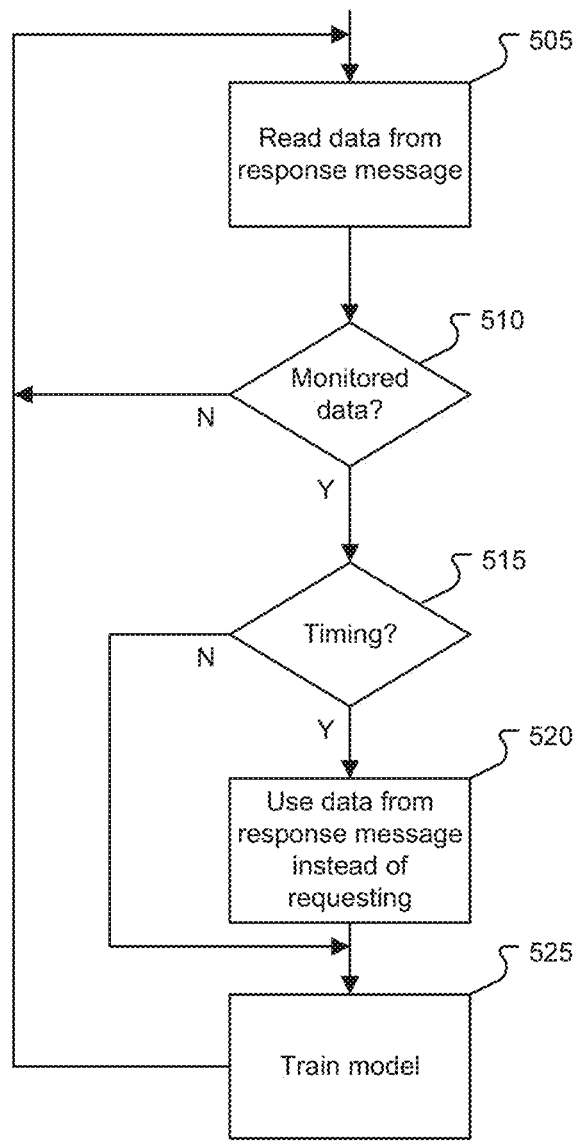
FIG. 5 is a flowchart illustrating additional details of modifying communications to avoid conflicts with detected third-party devices according to one embodiment of the present disclosure.

FIG. 5 is a flowchart illustrating additional details of modifying communications to avoid conflicts with detected third-party devices according to one embodiment of the present disclosure. As illustrated in this example, modifying electronic messages sent by the first device on the communications bus 205 based on the monitoring of the requests for data sent from the second device on the communications bus 205 and the responses to the requests sent to the second device on the communications bus 205 can comprise reading 505 data from the responses to the requests sent to the second device on the communications bus 505. A determination 510 can be made as to whether the data obtained is identified in a predefined list 356 of data collected by the first device. If so, a further determination 515 can be made as to whether a timing of the data, e.g., based on a time of day, interval etc. defined in the pre-defined list 356 matches or is within a pre-defined range of acceptable timing for the data. If so, this data can then be used 520, e.g., collected and saved, instead of sending a request for the same data from the first device.

Additionally, or alternatively, modifying electronic messages sent by the first device on the communications bus based on the monitoring of the requests for data sent from the second device on the communications bus and the responses to the requests sent to the second device on the communications bus can be based on a learned model 348 of electronic messages on the communications bus 205. Such a learning model 348 may provide indications of data requests made by other devices on the communications network 205 and the rate and/or timing of those requests. These indications can be used in addition to or instead of the pre-defined list of data 356 in determining 510 whether the read 505 data should be collected and determining 515 whether the timing is appropriate. Accordingly, the learned model can be trained 525 based on the listening to the electronic messages exchanged on the communications bus.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for avoiding redundant or conflicting communications on a communications bus, the method comprising:

listening, by a processor of a first device, to electronic messages exchanged on the communications bus, wherein the electronic messages comprise requests for data and responses to the requests for data;

detecting, by the processor of the first device, a second device communicating on the communications bus based on the electronic messages exchanged on the communication bus;

monitoring, by the processor of the first device, the requests for data sent from the second device on the communications bus and the responses to the requests sent to the second device on the communications bus; and modifying, by the processor of the first device, data within one or more electronic messages sent by the first device on the communications bus based on the monitoring of the requests for data sent from the second device on the communications bus and the responses to the requests sent to the second device on the communications bus within a predetermined period of time.

2. The method of claim 1, wherein the communications bus comprises a Controller Area Network (CAN) bus within a vehicle and wherein the first device and the second device comprise On-Board Diagnostic (OBD) II devices.

3. The method of claim 1, wherein detecting the second device communicating on the communications bus comprises detecting an address used by the second device.

4. The method of claim 1, wherein monitoring the requests for data sent from the second device on the communications bus comprises identifying data requested by the second device in the requests for data sent from the second device and a timing of the requests for data sent from the second device on the communications bus.

5. The method of claim 4, wherein modifying the data within the one or more electronic messages sent by the first device on the communications bus based on the monitoring of the requests for data sent from the second device on the communications bus and the responses to the requests sent to the second device on the communications bus comprises using data from the responses to the requests sent to the second device on the communications bus instead of sending a request for the data from the first device.

6. The method of claim 5, wherein the data is identified in a predefined list of data collected by the first device.

7. The method of claim 5, wherein modifying the data within the one or more electronic messages sent by the first device on the communications bus based on the monitoring of the requests for data sent from the second device on the communications bus and the responses to the requests sent to the second device on the communications bus is based on a learned model of electronic messages on the communications bus and wherein the learned model is trained based on the listening to the electronic messages exchanged on the communications bus.

8. A monitoring device comprising:
a processor; and
a memory coupled with and readable by the processor and storing therein a set of instructions which, when executed by the processor, causes the processor to:

listen to electronic messages exchanged on the communications bus, wherein the electronic messages comprise requests for data and responses to the requests for data;

detect a third-party device communicating on the communications bus based on the electronic messages exchanged on the communication bus;

monitor the requests for data sent from the third-party device on the communications bus and the responses to the requests sent to the third-party device on the communications bus; and modify data within one or more electronic messages sent by the monitoring device on the communications bus based on the monitoring of the requests for data sent from the third-party device on the communications bus and the responses to the requests sent to the third-party device on the communications bus within a predetermined period of time.

9. The monitoring device of claim 8, wherein the communications bus comprises a Controller Area Network (CAN) bus within a vehicle and wherein the monitoring device and the third-party device comprise On-Board Diagnostic (OBD) II devices.

10. The monitoring device of claim 8, wherein detecting the third-party device communicating on the communications bus comprises detecting an address used by the third-party device.

11. The monitoring device of claim 8, wherein monitoring the requests for data sent from the third-party device on the communications bus comprises identifying data requested by the third-party device in the requests for data sent from the third-party device and a timing of the requests for data sent from the third-party device on the communications bus.

12. The monitoring device of claim 11, wherein modifying the data within the one or more electronic messages sent by the monitoring device on the communications bus based on the monitoring of the requests for data sent from the third-party device on the communications bus and the responses to the requests sent to the third-party device on the communications bus comprises using data from the responses to the requests sent to the third-party device on the communications bus instead of sending a request for the data from the monitoring device.

13. The monitoring device of claim 12, wherein the data is identified in a predefined list of data collected by the monitoring device.

14. The monitoring device of claim 12, wherein modifying the data within the one or more electronic messages sent by the monitoring device on the communications bus based on the monitoring of the requests for data sent from the third-party device on the communications bus and the responses to the requests sent to the third-party device on the communications bus is based on a learned model of electronic messages on the communications bus and wherein the learned model is trained based on the listening to the electronic messages exchanged on the communications bus.

15. A non-transitory, computer-readable medium comprising a set of instructions stored therein which, when executed by a processor, causes the processor to:

listen to electronic messages exchanged on the communications bus, wherein the electronic messages comprise requests for data and responses to the requests for data;

detect, a third-party device communicating on the communications bus based on the electronic messages exchanged on the communication bus;

monitor the requests for data sent from the third-party device on the communications bus and the responses to the requests sent to the third-party device on the communications bus; and modify data within one or more electronic messages sent by the monitoring device on the communications bus based on the monitoring of the requests for data sent from the third-party device on the communications bus and the responses to the requests sent to the third-party device on the communications bus within a predetermined period of time.

16. The non-transitory, computer-readable medium of claim 15, wherein detecting the third-party device communicating on the communications bus comprises detecting an address used by the third-party device.

17. The non-transitory, computer-readable medium of claim 15, wherein monitoring the requests for data sent from the third-party device on the communications bus comprises identifying data requested by the third-party device in the requests for data sent from the third-party device and a timing of the requests for data sent from the third-party device on the communications bus.

18. The non-transitory, computer-readable medium of claim 17, wherein modifying the data within the one or more electronic messages sent by the monitoring device on the communications bus based on the monitoring of the requests for data sent from the third-party device on the communications bus and the responses to the requests sent to the third-party device on the communications bus comprises using data from the responses to the requests sent to the third-party device on the communications bus instead of sending a request for the data from the monitoring device.

19. The non-transitory, computer-readable medium of claim 18, wherein the data is identified in a predefined list of data collected by the monitoring device.

20. The non-transitory, computer-readable medium of claim 18, wherein modifying the data within the one or more electronic messages sent by the monitoring device on the communications bus based on the monitoring of the requests for data sent from the third-party device on the communications bus and the responses to the requests sent to the third-party device on the communications bus is based on a learned model of electronic messages on the communications bus and wherein the learned model is trained based on the listening to the electronic messages exchanged on the communications bus.

* * * * *